United States Patent [19]

Nagoshi

[11] Patent Number: 4,657,768

[45] Date of Patent: Apr. 14, 1987

[54] FREEZING METHOD FOR PERISHABLE FOODS

[75] Inventor: Kazunori Nagoshi, Ehime, Japan

[73] Assignee: Tadaaki Sakai, Osaka, Japan

[21] Appl. No.: 782,995

[22] Filed: Oct. 2, 1985

[51] Int. Cl.$^4$ ................................................ A23L 3/36
[52] U.S. Cl. ...................................... 426/524; 62/63; 62/64
[58] Field of Search ...................... 426/524; 62/62, 63, 62/64, 373

[56] References Cited

U.S. PATENT DOCUMENTS

| | | | |
|---|---|---|---|
| 1,641,441 | 9/1927 | Kolbe | 62/63 |
| 1,769,088 | 7/1930 | Vucassovich | 62/63 |
| 2,802,341 | 8/1957 | Polk | 62/63 |
| 3,091,194 | 5/1963 | Dickinson | 62/62 |

Primary Examiner—George Yeung
Attorney, Agent, or Firm—Koda and Androlia

[57] ABSTRACT

A method of freezing perishable foods including the steps of causing one surface of a heat conducting container to contact cooled brine or a liquified gas of a low-boiling point, and keeping an object to be frozen in contact with the other surface of the heat conducting container. Thus, the freezing of the food proceeds only from the surface contacting the heat conducting container.

2 Claims, 3 Drawing Figures

FREEZING METHOD FOR PERISHABLE FOODS

BACKGROUND OF THE INVENTION

1. Field of the Invention

The present invention relates to a method for freezing perishable foods, and more particularly to a freezing method for preserving animal meats, fish and shellfish, vegetables, and other processed foods for a long time in a fresh state.

2. Prior Art

As a freezing method for foods, there has been known a liquid immersion method. In this method foods are immersed in brine (non-freezing liquid) and because of close contact between the brine and food a high degree of freezing can be obtained.

Freezing is intended to establish a state wherein the texture of the food is barely effected and physical damage arising from concentrated compositions of ice crystals is prevented. Thus, freezing is done in order to prevent drips and the degeneration of the protein which might change the quality of the food during cold storage. Accordingly, the basic requirement is to freeze food as quickly as possible to keep the final temperature as low as practicable and to keep the cooling medium and food to be frozen in as close contact with each other as possible.

In this respect, the liquid immersion method is a good freezing process, and the present inventor has attempted to improve brine according to such a theory.

However, the conventional liquid immersion method has a disadvantage in that the ice crystals grow at the central portion of the food. In particular, one thick ice crystal extends from the central portion of the food toward the surface, and the texture at the center is undesirably damaged and consequently the quality of the food deteriorates. Although the mechanism of this phenomenon is unclear, the state thereof seems as if the textures were broken off from the central portion toward the surface. It is thus considered that the food is rapidly frozen from the entire surface to produce a strain due to the freezing at the center. When such strain reaches the limit, the texture is finally broken down.

As described above, according to the liquid immersion method the food is damaged at the central portion due to rapid freezing from the entire surface. The above defect has still a more serious effect in the crogenic liquid method which employs a liquified gas having an extremely low boiling point.

SUMMARY OF THE INVENTION

Accordingly, it is a primary object of the present invention to provide a method for freezing perishable foods. Particularly, the method of this invention is capable of freezing the entire food article in a favorable state without the quality of the food at its center deteriorating.

Although all of the conventional freezing method intend to increase the contact area with respect to the surface of the food articles as much as possible to permit rapid freezing, due to the defect caused by freezing food from the surface, the texture is damaged by the growth of ice crystals at the center of the food. The present invention attempts to freeze the food entirely from one surface so that freezing does not stop at the interior of the food.

For effecting the above, one surface of a heat conducting means such as a container, tray, flat plate, etc. contacts the cooled brine or liquefied gas (having a low boiling point). The other surface of the heat conducting means is adapted to contact the object to be cooled. Thus, freezing starts only from the contact surface with respect to the heat conducting means.

By means of the above method, freezing proceeds from only the surface of the food contacting the heat conducting means without freezing the food article as a whole. Therefore, ice crystals do not grow in the interior of the food article and the texture is not damaged. Freezing proceeds into the interior from the contact surface of the food article with the heat conducting means, and reaches the other surface of the food article so as to terminate thereat. Thus, uniform quality can be maintained at all parts of the frozen food article.

DETAILED DESCRIPTION OF THE INVENTION

Figure 1:
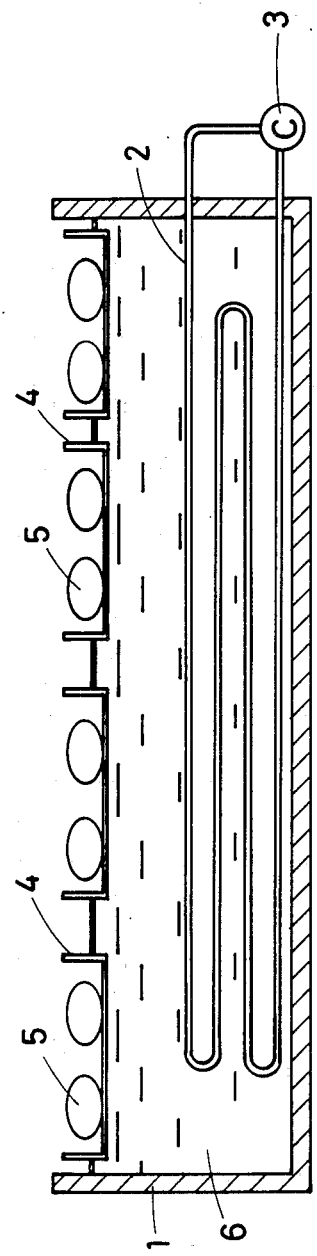
FIG. 1 is a schematic diagram of an apparatus for effecting a freezing method according to the present invention.

Referring now to the drawings, one preferred embodiment of the present invention will be described hereinbelow.

FIG. 1 is a schematic diagram of an apparatus embodying the method of the present invention. The apparatus generally includes a tank 1, piping 2 provided within the tank 1, a compressor 3, and containers 4. The containers 4 are heat conducting means and food articles 5 to be frozen are placed therein.

The tank 1 is filled with an inorganic or organic brine 6. The brine 6 is agitated by a stirring blade (not shown) within the tank 1, and is also cooled by a cooling medium such as ammonia, freon, etc. which circulates in the piping 2 through repeated compression, liquefaction, evaporation, etc. done by the compressor 3.

The shape of the containers 4 is not limited to the containers shown in FIG. 1, and may be in the form of trays, flat plates adapted not to sink, etc. as long as the food articles 5 to be frozen do not directly contact the brine 6.

Furthermore, in the present invention the containers 4, i.e. the heat conducting means, are formed to float on the brine 6. However, the containers 4 may be modified to be detachable in the tank as long as the brine does not get into the containers 4.

The heat conducting means is made of materials such as metal, resin, glass or composite materials thereof, etc.

In the present embodiment, since the containers 4 float, convection of the brine 6 by the stirring blade is not impaired. Thus, the liquid temperature in the vicinity of the surface can be kept low.

When freezing articles of food, the food articles 5 are first placed in the containers 4 and the containers 4 float on the brine 6 for one to two hours. Thereafter, the containers 4 are lifted from the brine 6 to remove the food articles 5. Attention is given to the fact that since heat conducting efficiency tends to be lowered when frost or ice adheres to the bottom surface of the containers 4 when accommodating the food articles 5 into the containers 4, the containers 4 must be raised from the brine 6 without fail to remove the frost or ice.

It should be noted that the brine employed in the present invention may be replaced with liquefied gases with low-boiling points such as liquid nitrogen, liquid carbon dioxide, etc.

The results of the experiments using the freezing method of the present invention will be described below.

EXPERIMENT 1

A piece of pork weighing about 1.1 kg and 75 mm thick was placed on an aluminum tray and frozen by the above-described method. The temperatures at various parts of the piece of pork were measured. The pork was chilled meat stored at 0° C.

The brine used was a solution prepared by mixing 40% propylene glycol, 10% calcium chloride, and 50% water, with the addition of a small amount of rapeseed oil and kept at −37° C.

Figure 2:
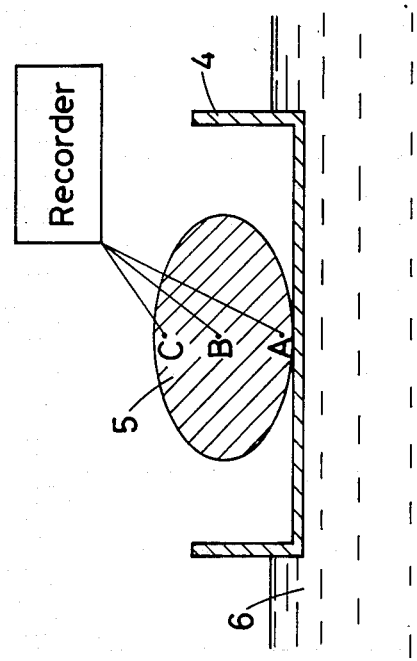
FIG. 2 is a side sectional view explaining the measuring method of the Experiment 1 of the invention.

As shown in FIG. 2, the temperature was measured at three different points, i.e. at 15 mm away from the tray in the vicinity of the center of the meat, at point B 40 mm away therefrom and at point C 75 mm away from the center of the meat.

Figure 3:
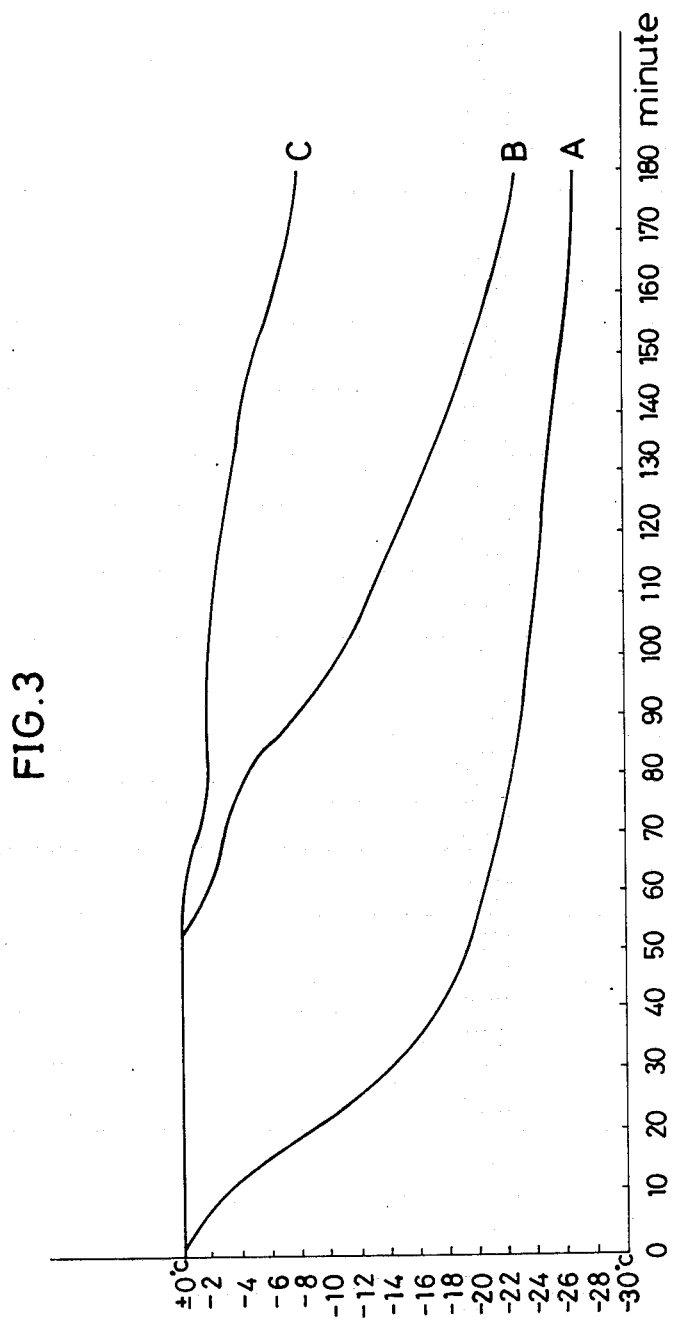
FIG. 3 shows freezing curves for pork.

In FIG. 3 the results of the measurements are shown in relation to temperature and time. FIG. 3 shows that freezing proceeds from the lower portion to the upper portion.

During three-hour freezing, temperatures of −27° C. were obtained at A, −23° C. at point B and −8° C. at point C, while the lowest temperatures were reached after five hours—−29° C. at point A, −27° C. at point B and −21° C. at point C. Thereafter, the temperatures remained constant.

As described above, the temperature of the frozen article became considerably lower when compared with conventional methods.

Investigation into the state of freezing in the interior of the meat showed no particular difference between the portion near the surface and the center, and no growth of ice crystals on the whole were identified.

After defrosting organoleptic tests were conducted in order to evaluate the "chilled meat" not frozen as 100 and the result of which is shown in Table 1 below. In Table 1, a similar evaluation made on frozen meet by direct immersion into the brine is also given.

TABLE 1

|  | Meat Frozen by the Method of the Present Invention | Meat Frozen by Direct Immersion |
| --- | --- | --- |
| COLOR | 100 | 90 |
| TASTE | 95 | 85 |
| FLAVOR | 90 | 90 |
| DRIP | None | A little |

As a result, it was found that meat frozen in accordance with the present invention is of a quality equal to chilled meat which has not been frozen, and is superior in quality when compared with frozen meat directly immersed and damaged in the center.

EXPERIMENT 2

Subsequently, various kinds of foods can be frozen according the method of the present invention.

For example, a piece of tuna meat 75 mm thick was frozen using the same process described in Experiment 1 and the quality of the meat after being defrosted was equally good as tuna meat not subjected to the freezing experiment.

When a round of yellowtail 400 mm long was frozen, the upper surface reach −25° C. in about one hour and the quality of the meat was equal to fresh.

When freezing oysters a temperature of 1°–20° C. was reached in about 20 minutes. There was no significance difference found in the freezing time of oysters with shells and oysters without shells. No drip was formed even when defrosted and the fresh, juicy quality was maintained.

When freezing shiitake (mushrooms), the defrosted shiitake was tough and juicy and equal in quality to fresh shiitake which had not been frozen.

Further, frozen tofu or bean curd when defrosted returned to its original state without degenerating into dried bean curd.

According to the present invention, freezing is effected from one surface of a food article to proceed into the whole food article. In other words, freezing does not start from the food article as a whole, therefore the entire food article can be frozen favorably without deterioration of quality at the center. Accordingly, a frozen food can be maintained in a state equal to fresh food.

Furthermore, the present invention is advantageous in that the foods are not required to be parcelled or wrapped up.

I claim:

1. A method for freezing perishable food articles comprising the steps of causing one surface of each of a heat conducting means having an open end to contact with a cooled brine or a liquified gas of a low boiling point which is contained within an open tank, and keeping a food article to be frozen in contact with the one surface of the heat conducting means, thereby causing said food article to be frozen only from the surface of the food article contacting said one surface of said heat conducting means whereby the formation of ice crystals in the interior of the food article is avoided.

2. A method for freezing perishable food articles as claimed in claim 1, wherein said heat conducting means is a shallow, plate-like metallic container, said metallic container floating on the surface of said brine or liquified gas.

* * * * *